US010685548B2

(12) United States Patent
Haddon et al.

(10) Patent No.: US 10,685,548 B2
(45) Date of Patent: Jun. 16, 2020

(54) LOW RESOLUTION ADAPTIVE DISTANCE DISPLAY

(71) Applicants: THE BOEING COMPANY, Chicago, IL (US); COMMONWEALTH SCIENTIFIC AND INDUSTRIAL RESEARCH ORGANISATION, Acton (AU)

(72) Inventors: David Haddon, Pullenvale (AU); Brett Wood, Pullenvale (AU); Navinda Kottege, Pullenvale (AU); Paul Flick, Pullenvale (AU)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/319,737

(22) PCT Filed: Jul. 21, 2017

(86) PCT No.: PCT/AU2017/050755
§ 371 (c)(1),
(2) Date: Jan. 22, 2019

(87) PCT Pub. No.: WO2018/014088
PCT Pub. Date: Jan. 25, 2018

(65) Prior Publication Data
US 2019/0333358 A1      Oct. 31, 2019

Related U.S. Application Data

(60) Provisional application No. 62/365,718, filed on Jul. 22, 2016.

(30) Foreign Application Priority Data

Oct. 11, 2016   (AU) ................................ 2016904094

(51) Int. Cl.
G08B 21/00   (2006.01)
G08B 21/18   (2006.01)
(Continued)

(52) U.S. Cl.
CPC ............. *G08B 21/182* (2013.01); *G08B 5/22* (2013.01); *G01S 7/51* (2013.01); *G01S 7/64* (2013.01); *G08G 1/16* (2013.01); *G08G 5/065* (2013.01)

(58) Field of Classification Search
CPC .......... G01S 15/10; G01S 15/981; G01S 7/64; E01D 1/00
(Continued)

(56) References Cited

U.S. PATENT DOCUMENTS 4,318,198 A * 3/1982 Drozd ................... B64F 1/3055
14/71.5
6,907,635 B2 * 6/2005 Hutton .................. B64F 1/3055
14/71.3
(Continued)

FOREIGN PATENT DOCUMENTS

DE            2951769 A1    7/1981
DE     102015205074 A1    3/2016
(Continued)

OTHER PUBLICATIONS

International Search Report and Written Opinion for International Application No. PCT/AU2017/050755 dated Sep. 28, 2017, 5 pages.
(Continued)

*Primary Examiner* — Toan N Pham
(74) *Attorney, Agent, or Firm* — Patterson + Sheridan, LLP

(57) ABSTRACT

Guide systems for indicating a distance between a first object and a second object and a method for visually
(Continued)

representing a distance between two objects as the distance reduces are provided. A sensor measures a distance between the first object and the second object. A processor receives a distance measurement from the sensor and determines whether the distance measured by the sensor is within one of a plurality of distance intervals. Upon determining that the distance is within one of the plurality of distance intervals, the processor displays a distance indicator on the display. The distance indicator is located on the display based on the distance according to a scale for the distance interval, where a display area on the display represents the distance interval. The scale for the distance intervals becomes finer as the distance between the first object and the second object decreases.

28 Claims, 10 Drawing Sheets

(51) Int. Cl.
*G08B 5/22* (2006.01)
*G01S 7/51* (2006.01)
*G01S 7/64* (2006.01)
*G08G 1/16* (2006.01)
*G08G 5/06* (2006.01)

(58) Field of Classification Search
USPC .......................................... 340/686.1, 686.6
See application file for complete search history.

(56) References Cited

U.S. PATENT DOCUMENTS

| 7,093,314 | B2* | 8/2006 | Hutton | B64F 1/3055 |
| | | | | 14/71.5 |
| 8,629,800 | B2* | 1/2014 | Anderson | B60Q 1/48 |
| | | | | 342/109 |
| 2012/0044093 | A1 | 2/2012 | Pala | |
| 2016/0084957 | A1 | 3/2016 | Krug et al. | |

FOREIGN PATENT DOCUMENTS

| GB | 2266369 A | 10/1993 |
| WO | 2018014088 A1 | 1/2018 |

OTHER PUBLICATIONS

European Patent Office Extended European Search Report for Application No. 17830120.6-1206/3488259 dated Feb. 13, 2020.

* cited by examiner

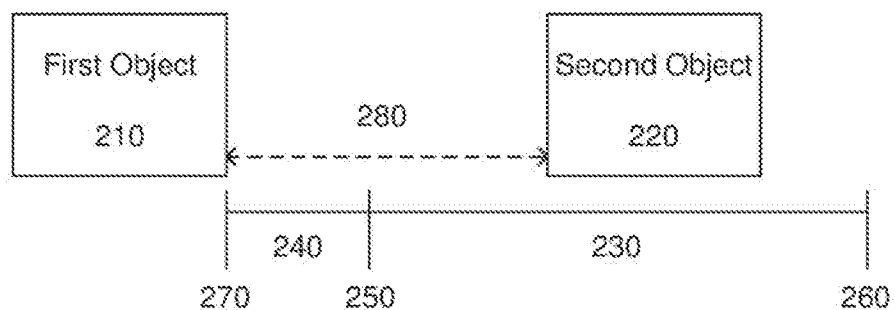
Fig. 2
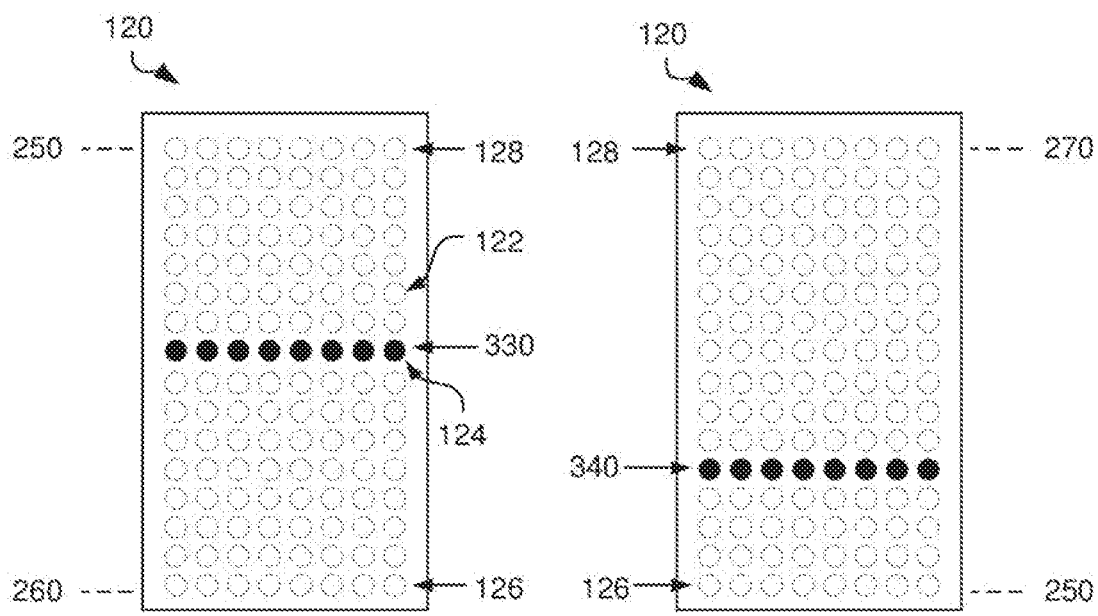
Fig. 3
Fig. 4

LOW RESOLUTION ADAPTIVE DISTANCE DISPLAY

FIELD

This disclosure relates to guide systems and methods to assist with movement of objects. In particular, this disclosure relates to guide systems and methods to assist with movement of two objects closer together.

BACKGROUND

In the aerospace industry, passenger stairs are moved against aeroplanes during construction, testing and lifetime operations of aeroplanes. The stairs are typically large and are often moved with forklifts or small, powerful towing vehicles known as "tugs". If the stairs are pushed too hard against the aeroplane, the stairs can cause a significant amount of damage to the aeroplane.

The distance between the stairs and the aeroplane can be difficult for the operator of the fork lift or tug to see or judge. Therefore, a need exists for a guide system and/or method for indicating a distance between a first object and a second object and/or a method for visually representing a distance between two objects as the distance changes.

SUMMARY

A guide system for indicating a distance between a first object and a second object comprises: a sensor to measure a distance between the first object and the second object; a display including a display area; and a processor communicatively coupled to the sensor and the display, the processor being configured to:

determine whether the distance measured by the sensor is within a far distance interval and upon determining that the distance is within the far distance interval to display a far distance indicator in the display area on the display, the far distance indicator being located in the display area based on the distance according to a coarse scale where the display area represents the far distance interval; and determine whether the distance measured by the sensor is within a close distance interval and upon determining that the distance is within the close distance interval to display a close distance indicator in the display area on the display, the close distance indicator being located in the display area based on the distance according to a fine scale where the display area represents the close distance interval.

The processor may be configured to determine that the distance measured by the sensor is within the far distance interval if the distance is between a threshold distance and a maximum distance.

The coarse scale may define locations along the display such that one end of the display or the display area corresponds to the maximum distance and the other end of the display or the display area corresponds to the threshold distance.

The processor may be configured to determine that the distance measured by the sensor is within the close distance interval if the distance is between a minimum distance and the threshold distance.

The fine scale may define locations along the display such that one end of the display corresponds to the threshold distance and the other end of the display corresponds to the minimum distance.

The processor may be configured to receive one or more of the minimum distance, the maximum distance and the threshold distance.

The processor may be configured to receive the minimum distance and the maximum distance, and determine the threshold distance based on the minimum distance and the maximum distance.

The processor may be configured to determine the threshold distance as being the minimum distance plus a percentage of the range between the minimum distance and the maximum distance.

The system may comprise a calibration button, and the processor may be configured to set the minimum distance, the maximum distance or the threshold distance based on the distance measured by the sensor when the calibration button is activated.

The processor may be configured to display the far distance indicator in a first color and the close distance indicator in a second color that is distinct from the first color.

The processor may be configured to display the far distance indicator or the close distance indicator to represent the first object and a second indicator to represent the second object.

The processor may be configured to display the far distance indicator or the close distance indicator and the second indicator as parallel lines.

The processor may be configured to locate the far distance indicator relative to the second indicator on the display based on the distance measured by the sensor and the coarse scale.

The processor may be configured to locate the close distance indicator relative to the second indicator on the display based on the distance measured by the sensor and the fine scale.

The processor may be configured to display the close distance indicator across a greater number of pixels than the far distance indicator.

The processor may be configured to determine whether the distance measured by the sensor is within a further distance interval and upon determining that the distance is within a further distance interval to display a further distance indicator on the display, the further distance indicator being located on the display based on the distance according to a further scale.

The display may have less than 1000 pixels.

The display may have a pixel density of less than 50000 pixels per square metre.

The display may be a dot matrix display.

The dot matrix display may be a multicolor light emitting diode (LED) matrix.

The dot matrix display may have a rated luminance of greater than 1000 cd/m2.

The display may be configured to be mounted on the first object or the second object, or a vehicle moving the first object or the second object.

The system may further comprising a photovoltaic power supply connected to the processor, the sensor and the display.

The far distance indicator and the close distance indicator may be lines.

A method for indicating a distance between a first object and a second object comprises:

determining whether the distance measured by the sensor is within a far distance interval and upon determining that the distance is within the far distance interval displaying a far distance indicator in a display area on a display, the far distance indicator being located in the display area based on the distance according to a coarse scale where the display area represents the far distance interval; and determining whether the distance measured by the sensor is within a close distance interval and upon determining that the distance is within the close distance interval displaying a close distance indicator in the display area on the display, the close distance indicator being located in the display area based on the distance according to a fine scale where the display area represents the close distance interval.

A method for visually representing a distance between two objects as the distance reduces comprises:

displaying a distance indicator in a display area on a display as the objects move closer to each other moving the distance indicator from one end of the display area towards another end of the display area, the space between the one end and the other end of the display area representing a first interval of distance between the two objects and when the two objects become closer to each other than a distance threshold, the space between the one end and the other end of the display area represents a second and smaller interval of distance between the two objects.

A guide system for indicating a distance between a first object and a second object comprises: sensors configured to point in distinct directions to measure distances in the respective directions between the first object and the second object; a display associated with each sensor; and a processor communicatively coupled to the sensors and the displays, the processor being configured to:

determine whether the distance measured by each of the sensors is within a far distance interval and upon determining that the distance is within the far distance interval to display a far distance indicator in a display area on the respective display, the far distance indicator being located in a display area based on the distance according to a coarse scale where the display area represents the far distance interval; and determine whether the distance measured by each of the sensors is within a close distance interval and upon determining that the distance is within the close distance interval to display a close distance indicator in the display area on the respective display, the close distance indicator being located in the display area based on the distance according to a fine scale where the display area represents the close distance interval.

The displays may be oriented based on the direction to which the respective sensor points.

Further forms and/or features of the present disclosure will become apparent from the following detailed description.

DRAWINGS

An example will now be described with reference to the following figures:

FIG. 2 illustrates a first object and a second object, and a scale showing distance intervals in accordance with an embodiment of the disclosure.

FIG. 3 illustrates a display of the system showing a far distance indicator in accordance with an embodiment of the disclosure.

FIG. 4 illustrates the display showing a close distance indicator in accordance with an embodiment of the disclosure.

DESCRIPTION

A guide system is provided for indicating a distance between a first object and a second object. The guide system comprises a sensor to measure a distance between the first object and the second object, a display, and a processor communicatively coupled to the sensor and the display. The processor is configured to determine whether the distance measured by the sensor is within one of a plurality of distance intervals, such as a far distance interval and a close distance interval. Upon determining that the distance is within one of the plurality of distance intervals, the processor displays a distance indicator on the display. The distance indicator is located on the display based on the distance according to a scale for the distance interval. That is, a display area on the display represents the distance interval that the distance is within. This display area is reused to represent each different distance interval, and the distance indicator is located within this display area based on the distance according to the scale for the respective distance interval. Hence, the entire display or display area may change resolution or scale in relation to real world distance based on which distance interval the distance measured by the sensor falls within. The distance indicator or another feature of the display may change appearance to allow a user to identify the distance interval for which the distance indicator is being displayed. In some embodiments, the scale for the distance intervals at smaller distances is finer than the scale for the distance intervals at larger distances.

As a skilled person will appreciate, the terms "display" and "display area" may refer to a part or parts of a larger display, and therefore are not intended to limit the meaning to requiring the whole screen area of physical display unit.

In some embodiments described herein, the display is a dot matrix display. It is noted, however, that other displays, such as LCD displays may also be used and any parts of the description herein is applicable to other displays than dot matrix displays.

In some embodiments, the processor is communicatively coupled to multiple sensors and a display associated with each sensor. The sensors are configured to point in distinct directions to measure distances in the respective directions between the first object and the second object. The processor is configured to determine whether the distance measured by each of the sensors is within one of a plurality of distance intervals and upon determining that the distance is within one of the plurality of distance intervals to display a distance indicator on the respective display. The distance indicator is located on the respective display based on the distance measured by the associated sensor according to a scale for the distance interval.

Figure 1:
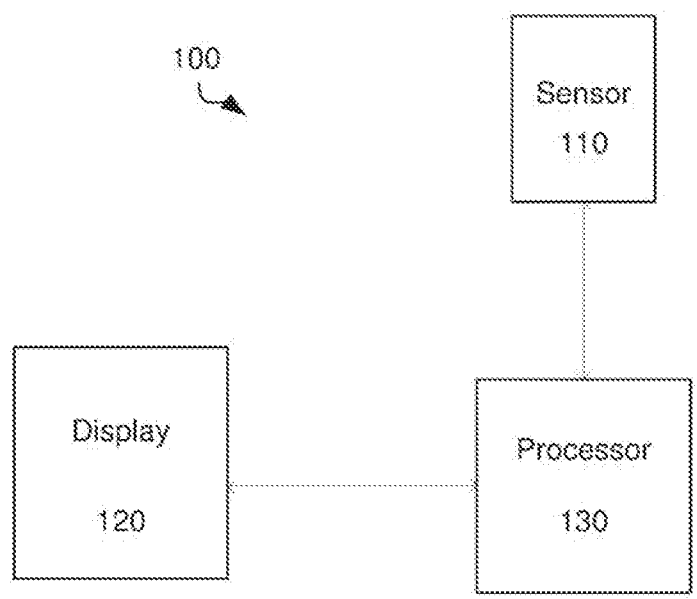
FIG. 1 illustrates a guide system for indicating a distance between a first object and a second object in accordance with an embodiment of the invention.

FIG. 1 illustrates a guide system 100 for indicating a distance between a first object and a second object in accordance with an embodiment of the disclosure. The guide system comprises a sensor 110, a display 120 and a processor 130 communicatively coupled to the sensor 110 and the display 120.

The processor 130 receives a distance measurement from the sensor 110 and determines whether the distance measured by the sensor 110 is within one of a plurality of distance intervals. Upon determining that the distance is within one of the plurality of distance intervals, the processor 130 displays a distance indicator on the display 120. The distance indicator is located on the display 120 or in a display area of the display based on the distance according to a scale for the distance interval. Here the display area represents the distance interval.

In some embodiments, the scale for the distance intervals becomes finer as the distance between the first object and the second object decreases. For example, upon the processor 130 determining that the distance is within a far distance interval, the processor 130 displays a far distance indicator on the display 120. The far distance indicator is located on the display 120 based on the distance according to a coarse scale. Upon determining that the distance is within the close distance interval, the processor 130 displays a close distance indicator on the display 120. The close distance indicator is located on the display 120 based on the distance according to a fine scale. That is, the coarse scale maps distances within the far distance interval to locations along the display, and the fine scale maps different distances within the close distance interval to the same locations along the display.

The sensor 110 is, for example, a distance sensor or a ranging sensor, and may measure a distance between the first object and the second object via SONAR, LIDAR and/or another ranging technology. In one example, the distance sensor or a ranging sensor is a sensor which measures the distance between the objects directly. That is, the distance sensor or ranging sensor measures or determines the distance without using a difference in a measured position of the two objects in an external coordinate system, such as the Global Positioning System (GPS). In one example, the sensor 110 is a multi-modal sensor comprising, for example, a laser based sensor and an ultrasonic sensor. In some embodiments, the processor 130 compares the readings of two or more sensors in the multi-modal sensor and determines the distance as being the closest distance based on the sensor readings. This can enable the system to be more robust than using only one type of sensor and can mitigate the risk of a collision between the first object and the second object when one sensor reading is inaccurate.

In some embodiments, the display 120 is a low resolution display, for example, having less than 1000 pixels and/or a pixel density of less than 50000 pixels per square metre. In preferred embodiments, the display 120 has a rated luminance of greater than 1000 cd/m². This can allow the distance indicator on the display 120 to be easily read by an operator in daylight. In some embodiments, the display is a multicolor light emitting diode (LED) matrix. This LED matrix may have only a single column of LEDs, such as 10 or 20 LEDs in a straight line. In some embodiments, the processor 130 displays the distance indicator on the display 120 in a distinct color for each distance interval. In some embodiments, the processor 130 changes other factors between distance intervals, such as the length or the width of the distance indicator. This can allow the distance intervals to be distinguished by an operator. In one example, the width of the distance indicator increases for each distance interval as the distance between the objects decreases.

FIG. 2 illustrates a first object 210 and a second object 220, and a scale showing distance intervals in accordance with an embodiment of the disclosure. The distance intervals include a far distance interval 230 and a close distance interval 240. The far distance interval 230 comprises a first range between a threshold distance 250 and a maximum distance 260. The close distance interval 240 comprises a second range between a minimum distance 270 and the threshold distance 250. A distance 280 that is measured by the sensor 110 is shown between the first object 210 and the second object 220.

The sensor 110 may be mounted to the first object 210 or the second object 220. The display 120 may be mounted to the first object 210 or the second object 220, or a vehicle moving the first object or the second object. In one example, the first object 210 is aeroplane stairs and the second object 220 is a plane toward which the aeroplane stairs are to be moved. An operator can use the distance indicator on the display as a guide when moving the aeroplane stairs, for example, via a forklift or tug. The change to a fine scale as the aeroplane stairs move closer to the aeroplane allows the operator to accurately position the aeroplane stairs relative to the aeroplane. In another example, the first object 210 is vehicle and the second object 220 is a hazard in the vehicles surroundings. The guide system 100 assists the operator of the vehicle with moving the vehicle closer to the hazard without colliding with the hazard.

In some embodiments, the processor 130 is configured to determine that the distance 280 measured by the sensor 110 is within the far distance interval 230 if the distance 280 is between the threshold distance 250 and the maximum distance 260, and determine that the distance 280 measured by the sensor 110 is within the close distance interval 240 if the distance 280 is between a minimum distance 270 and the threshold distance 250. For example, the processor 130 determines that the distance 280 shown in FIG. 2 is within the far distance interval 230 and displays the far distance indicator on the display 120 according to a coarse scale to indicate the distance 280, as shown, for example, in FIG. 3. In some embodiments, the processor 130 determines a ratio of the distance to the range between the minimum distance 270 and the maximum distance 260. The processor 130 then determines whether to display the far distance indicator on the coarse scale or the close distance indicator on the fine scale based on the ratio.

For example, the minimum distance is between 0.005 m, 0.05 m, 0.1 m or 0.5 m and 0.05 m, 0.1 m or 1 m. For example, the maximum distance is between 0.2 m, 0.5 m, 1 m or 10 m and 1 m, 5 m or 10 m. For example, the threshold distance is less than 5%, 10%, 20% or 30% of the maximum distance.

FIG. 3 illustrates the display 120 showing a far distance indicator 330 in accordance with an embodiment of the disclosure. In one example, the display 120 is a dot matrix display. Lit pixels 122 of the display 120 are represented in black and dark pixels 124 of the display 120 are represented in white. In the embodiment shown the display has 128 pixels being 8 pixels wide and 16 pixels long.

In the embodiment shown, the far distance indicator 330 is a line. The far distance indicator 330 is located on the display 120 based on the distance 280 measured by the sensor 110 according to a coarse scale. The coarse scale defines locations along a dimension of a display area of the display 120 such that a first end 126 of the display 120 corresponds to the maximum distance 260 and a second end 128 of the display 120 corresponds to the threshold distance 250. As the first object 210 and the second object 220 move closer together, the far distance indicator 330 moves along the display 120 toward the second end 128. If the distance 280 between the first object 210 and the second object 220 becomes less than the threshold distance 250 but is still greater than the minimum distance 270, the processor 130 determines that the distance 280 is within the close distance interval 240 and displays the close distance indicator on the display 120 according to a fine scale to indicate the distance 280, as shown, for example, in FIG. 4.

FIG. 4 illustrates the display 120 showing a close distance indicator 340 in accordance with an embodiment of the disclosure. In the embodiment shown, the close distance indicator 340 is a line. The close distance indicator 340 is located on the display 120 based on the distance 280 measured by the sensor 110 according to a fine scale. The fine scale defines locations along the dimension of the display area of the display 120 such that the first end 126 of the display 120 corresponds to the threshold distance 250 and the second end 128 of the display 120 corresponds to the minimum distance 270. As the first object 210 and the second object 220 move closer together, the close distance indicator 330 moves along the display 120 toward the second end 128.

In some embodiments, if the distance 280 between the first object 210 and the second object 220 becomes less than the minimum distance 250, the processor 130 displays a distance indicator according to an even finer scale. In some embodiments, if the distance 280 between the first object 210 and the second object 220 becomes less than the minimum distance 250, the processor 130 displays a stop indicator on the screen. For example, the stop indicator warns the operator moving the first object 210 or the second object 220 to stop moving the first object 210 and the second object 220 closer together.

In some embodiments, if the distance 280 between the first object 210 and the second object 220 is greater than the maximum distance 260, the processor 130 displays a distance indicator according to a coarser scale. In some embodiments, if the distance 280 between the first object 210 and the second object 220 is greater than the maximum distance 260, the processor 130 displays no indicator on the display 120.

Figure 5:
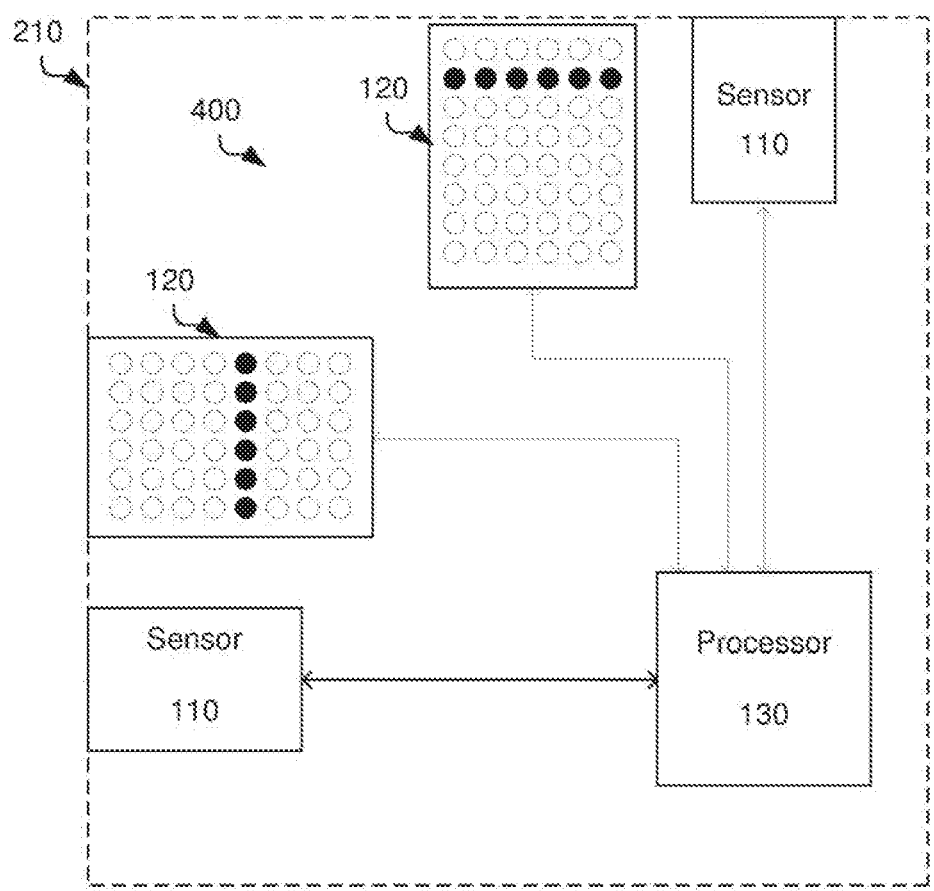
FIG. 5 illustrates a guide system for indicating a distance between a first object and a second object in multiple directions in accordance with an embodiment of the disclosure.

FIG. 5 illustrates a guide system 400 for indicating a distance between a first object and a second object in accordance with an embodiment of the disclosure. The guide system 400 comprises sensors 110 configured to point in distinct directions to measure distances in the respective directions between the first object and the second object. A display 120 is associated with each sensor 110 and a processor 130 is communicatively coupled to the sensors 110 and the displays 120.

The processor 130 is configured to determine whether the distance measured by each of the sensors 110 is within one of a plurality of distance intervals. Upon determining that the distance is within one of the plurality of distance intervals, the processor 130 displays a distance indicator on the respective display 120. The distance indicator is located on the respective display 120 based on the distance measured by the associated sensor 110 according to a scale for the distance interval.

For example, if the processor 130 determines that the distance for one of the sensors 110 is within a far distance interval, the processor 130 displays a far distance indicator on the respective display 120. The far distance indicator is located on the respective display based on the distance measured by the associated sensor 110 according to a coarse scale. If the processor 130 determines that the distance for one of the sensors 110 is within a close distance interval, the processor 130 displays a close distance indicator on the respective display 120. The close distance indicator is located on the display 120 based on the distance according to a fine scale.

In some embodiments, the displays are oriented based on the direction to which the respective sensor points. For example, the distance indicator moves along each display 120 in the direction which the respective sensor 110 points as the distance measured by the sensor 110 decreases. This can make it more intuitive for an operator to interpret the indications of distance provided by multiple displays 120. In some embodiments, the processor 130 displays the distance indicator according to different distance intervals for each display 120.

In some embodiments, the guide system 400 is mounted to the first object 210 or the second object 220, or a vehicle moving the first object 210 or the second object 220. FIG. 5 illustrates the guide system 400 mounted to the first object 210 and indicating a distance between the first object 210 and the second object 220 in two distinct directions using two displays 120.

In some embodiments, each sensor 110 and associated display 120 is connected to a separate processor 130. That is, the guide system can comprise two or more subsystems which each comprise a display 120, one or more sensors 110 and a processor 130. In one example, the subsystems are in communication with one another. In one example, the subsystems function independently. In some embodiments, the guide system comprises more than two subsystems. In one example, the guide system comprises four subsystems.

Figure 6:
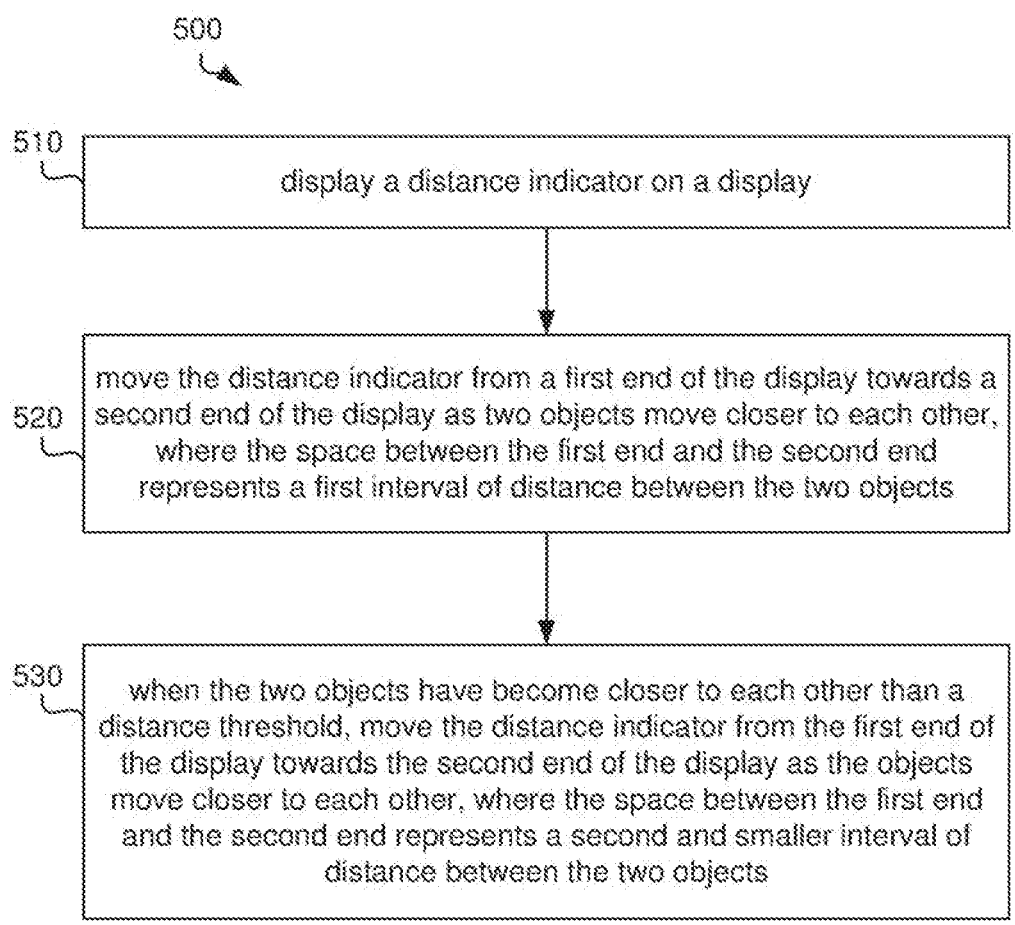
FIG. 6 illustrates a method for visually representing a distance between two objects as the distance reduces in accordance with an embodiment of the disclosure.

FIG. 6 illustrates a method 500 for visually representing a distance between two objects as the distance reduces in accordance with an embodiment of the disclosure. In some embodiments, the method 500 is performed in the system 100 or the system 400. For example, distance between the two objects may reduce as one object moves towards the other, as both objects move on convergent, that is intersecting, but not collinear paths, or as both objects move collinearly in the same direction but with the lagging object moving at a higher speed, or as objects move along non-linear intersecting paths. The movement of objects may comprise translation as well as rotation, such as in the case of robotic arms, booms or rotatable gangways.

In 510, the method 500 comprises displaying a distance indicator on a display. For example, distance indicator is a line as shown in FIGS. 3 and 4.

In 520, the method 500 comprises moving the distance indicator from a first end of the display towards a second end of the display as the objects move closer to each other, where the space between the first end and the second end represents a first interval of distance between the two objects.

In 530, the method 500 comprises, when the two objects have become closer to each other than a distance threshold, moving the distance indicator from the first end of the display towards the second end of the display as the objects move closer to each other, where the space between the first end and the second end represents a second and smaller interval of distance between the two objects.

FIGS. 7-14 illustrate examples of the display 120 in the guide system 100 or the guide system 400 as the first object and the second object move closer together.

Figure 7:
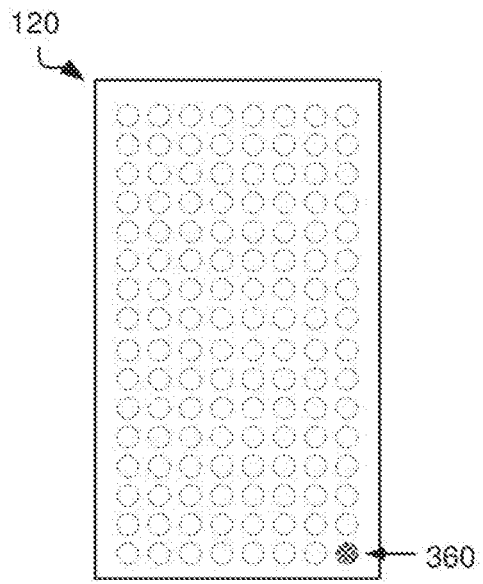
FIG. 7 illustrates the display when a distance measured by a sensor is greater than a maximum distance in accordance with an embodiment of the disclosure.

FIG. 7 illustrates the display 120 when the distance measured by the sensor 110 is greater than the maximum distance in accordance with an embodiment of the disclosure. The display 120 does not show a distance indicator. The processor 130 displays a status indicator 360 on a pixel of the display 120 to indicate that the display 120 is switched on and working. While the status indicator is shown on a single pixel of the display 120, in some embodiments the status indicator may extend over multiple pixels of the display 120.

Figure 8:
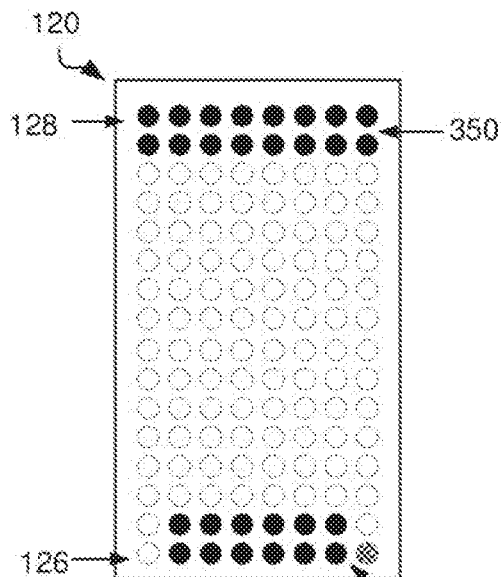
FIG. 8 illustrates the display showing the far distance indicator when the distance measured by the sensor is about the maximum distance in accordance with an embodiment of the disclosure.

FIG. 8 illustrates the display 120 showing the far distance indicator 330 when the distance measured by the sensor 110 is about the maximum distance in accordance with an embodiment of the disclosure. The processor 130 displays the far distance indicator 330 at the first end of the display 120. The far distance indicator 330 represents the first object 210. In the embodiment shown, the processor 130 also displays a second indicator 350 at the second end of the display 120 to represent the second object 220. In the embodiment shown, the far distance indicator 330 and the second indicator 350 are parallel lines. The processor 130 locates the far distance indicator 330 relative to the second indicator 350 on the display 120 based on the distance measured by the sensor 110 and the coarse scale. The status indicator 360 comprises a pixel that is a different color to the indicators and/or flashes. This allows an operator to distinguish the status indicator 360 from the distance indicators.

Figure 9:
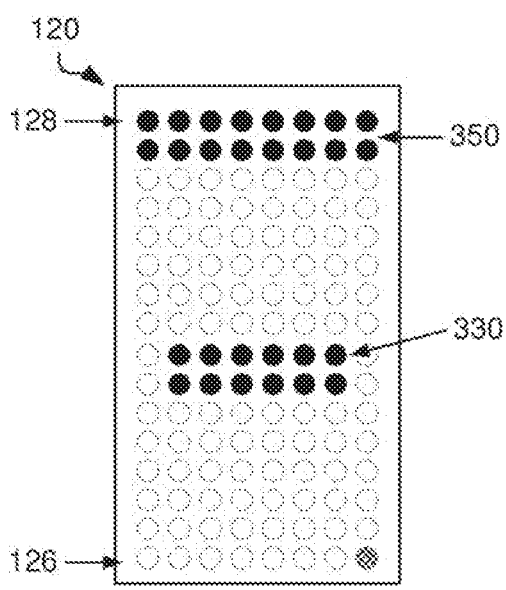
FIG. 9 illustrates the display showing the far distance indicator when the distance measured by the sensor is about half the maximum distance.

FIG. 9 illustrates the display 120 showing the far distance indicator 330 when the distance measured by the sensor 110 is about half the maximum distance. The processor 130 displays the far distance indicator 330 about half way between the first end and the second end of the display 120. The processor 130 continues to display the second indicator 350 at the second end of the display 120 to represent the second object 220.

Figure 10:
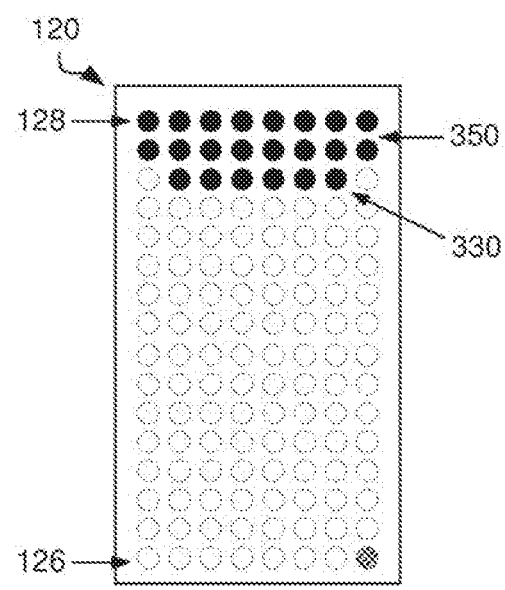
FIG. 10 illustrates the display showing the far distance indicator when the distance measured by the sensor is approaching a threshold distance.

FIG. 10 illustrates the display 120 showing the far distance indicator 330 when the distance measured by the sensor 110 is approaching the threshold distance. The processor 130 displays the far distance indicator 330 near the second end of the display 120.

Figure 11:
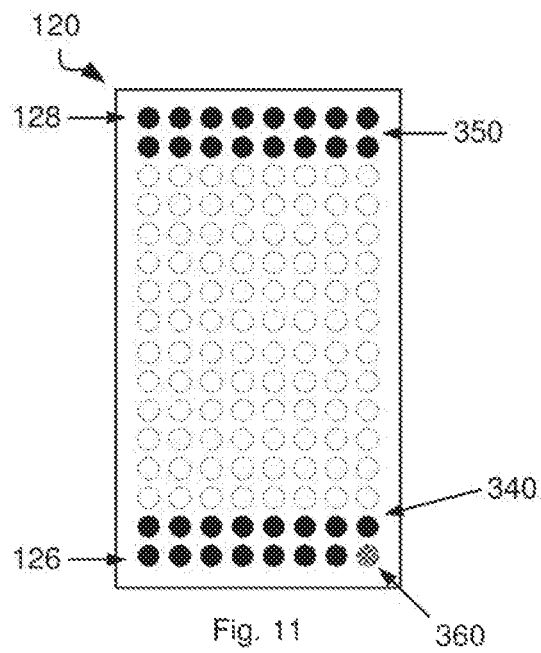
FIG. 11 illustrates the display showing the close distance indicator when the distance measured by the sensor is around the threshold distance in accordance with an embodiment of the disclosure.

FIG. 11 illustrates the display 120 showing the close distance indicator 340 when the distance measured by the sensor 110 is around the threshold distance in accordance with an embodiment of the disclosure. The processor 130 displays the close distance indicator 340 near the first end of the display 120. The processor 130 locates the close distance indicator 340 relative to the second indicator 350 on the display 120 based on the distance measured by the sensor 110 and the fine scale. The status indicator 360 is shown to be visible even though it overlaps with the close distance indicator 340. The close distance indicator 340 is longer than the far distance indicator 330, and may be a different color to the far distance indicator 330, to distinguish the close distance indicator 340 from the far distance indicator 330.

Figure 12:
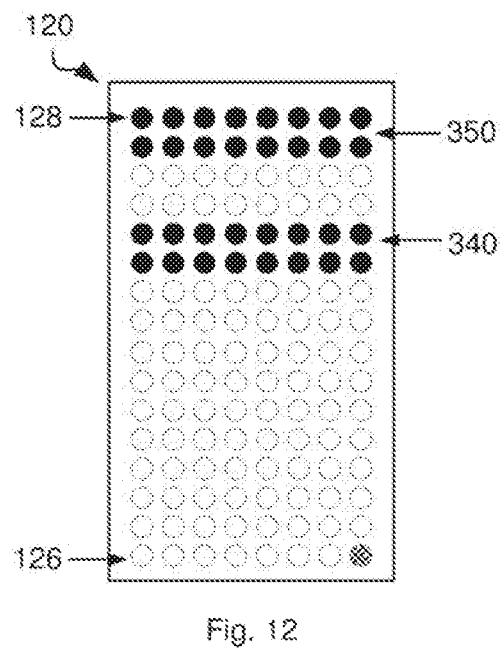
FIG. 12 illustrates the display showing the close distance indicator when the distance measured by the sensor is around a third of the threshold distance.

FIG. 12 illustrates the display 120 showing the close distance indicator 340 when the distance measured by the sensor 110 is around a third of the threshold distance. The processor 130 displays the close distance indicator 340 approaching the second end of the display 120.

Figure 13:
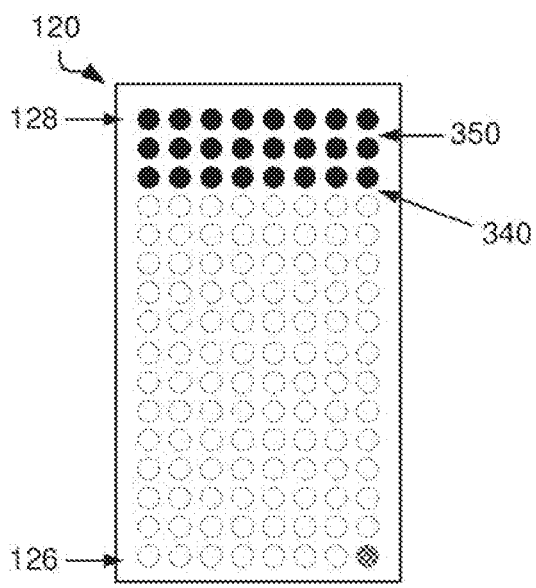
FIG. 13 illustrates the display showing the close distance indicator when the distance measured by the sensor is approaching a minimum distance.

FIG. 13 illustrates the display 120 showing the close distance indicator 340 when the distance measured by the sensor 110 is approaching the minimum distance. The processor 130 displays the close distance indicator 340 near the second end of the display 120.

Figure 14:
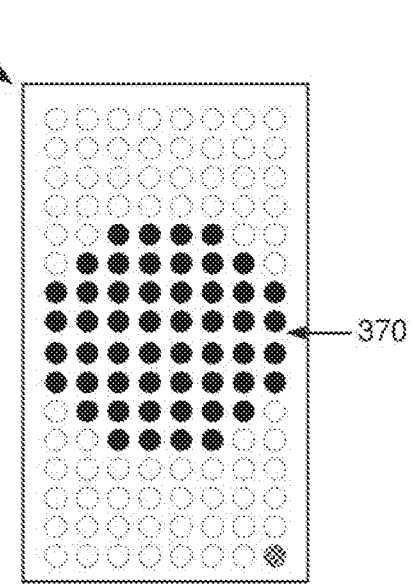
FIG. 14 illustrates the display when the distance measured by the sensor is at or past the minimum distance in accordance with an embodiment of the disclosure.

FIG. 14 illustrates the display 120 when the distance measured by the sensor 110 is around the minimum distance in accordance with an embodiment of the disclosure. The processor 130 displays a stop indicator 370. The stop indicator 370 can warn the operator not to bring the first object 210 and the second object 220 any closer together. In some embodiments, the processor 130 displays the stop indicator 370 in a different color to the distance indicators. For example, the processor 130 displays the far distance indicator 330 in green to indicate that there is little risk of collision between the two objects if the operator proceeds to move them closer together, the close distance indicator 340 in orange to indicate that there is an increased risk of collision between the two objects if the operator proceeds to move them closer together so the operator should proceed carefully, and the stop indicator 370 in red to indicate that there is a high risk of collision between the two objects if the operator proceeds to move them closer together.

Figure 15:
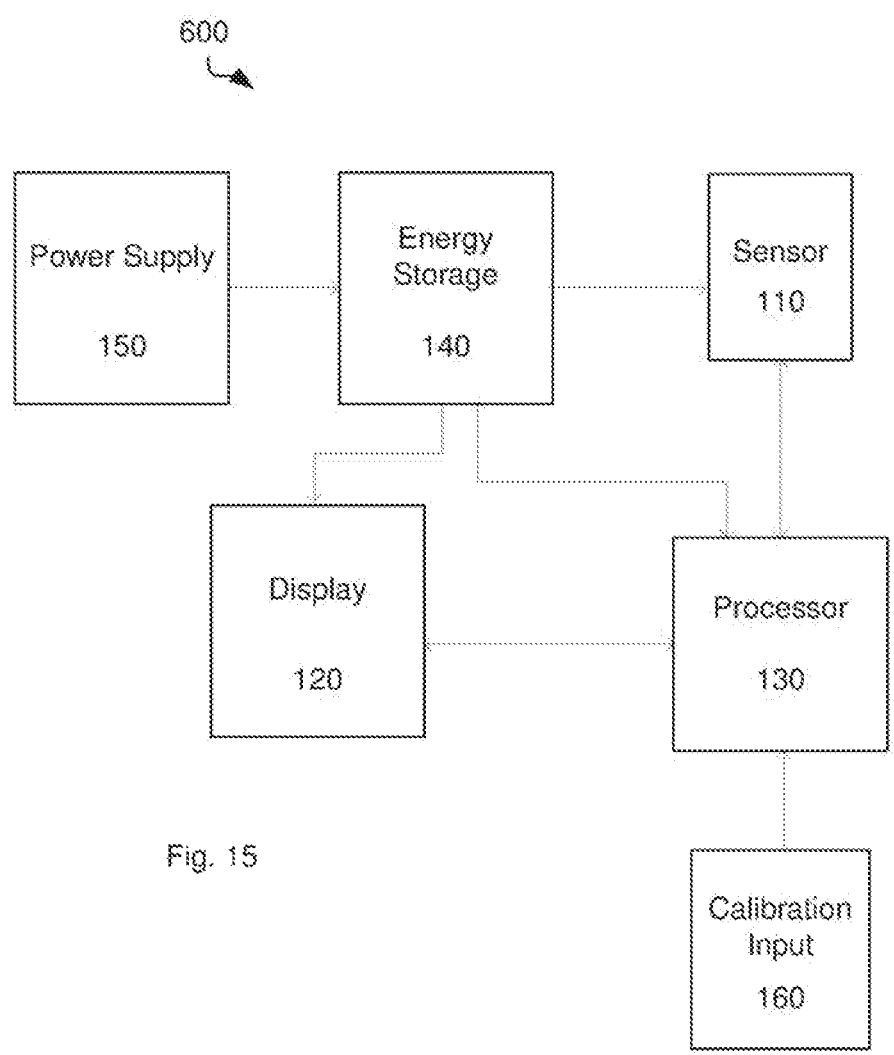
FIG. 15 is a block diagram of a third guide system for indicating a distance between a first object and a second object in accordance with an embodiment of the disclosure.

FIG. 15 is a block diagram of a guide system 600 for indicating a distance between a first object and a second object in accordance with an embodiment of the disclosure. The guide system comprises a sensor 110, a display 120 and a processor 130 communicatively coupled to the sensor 110 and the display 120. The sensor 110, the display 120 and the processor 130 are connected to an energy storage 140, such as a battery, which powers the sensor 110, the display 120 and the processor 130. The energy storage 140 can be connected to a power supply 150 to recharge the energy storage 150. In some embodiments, the power supply 150 is a photovoltaic power supply. For example, the photovoltaic power supply recharges the energy storage 140 during daylight. In some embodiments, the power supply 150 is connected directly to the sensor 110, the display 120 and the processor 130 to power the sensor 110, the display 120 and the processor 130. For example, during daylight the photovoltaic power supply may power the sensor 110, the display 120 and the processor 130 directly.

In one example, the guide system 600 comprises a wake-up input to wake-up the guide system 600 for a predetermined period of time. For example, the wake-up input may be connected to a wheel sensor, such as a magnetic wheel sensor and/or magnetic reed switch, that wakes up the guide system 600 when the wheel sensor indicates movement of the wheel. The guide system 600 may then stay awake as long as the wheel sensor indicates movement or up to a predetermined time period, such as 5 minutes, when no movement is indicated. This increases battery life as the system 600 turned off during times of inactivity. This is particularly useful in application where machinery, such as moveable stairs, remains unused for long periods of time. This further allows reliance on solar panels to recharge the battery. There may also be a manual override to power-up the guide system 600 manually in case an operator needs to use the display without or before moving the stairs. For example, the operator may want to check the battery level before moving, so the operator can manually turn on the system to check the battery status and if the display does not show a low battery warning it is safe for the operator to assume that there is enough energy in the battery to use the system. The above wake-up functionality may be implemented as a separate wake-up module that is connected to the guide system 600. It is noted that the magnetic reed switch acts as a mechanical switch with zero off current which avoids current consumption for monitoring movement thereby extending battery life during inactivity.

The guide system 600 comprises a calibration input 160 which can be used to calibrate the guide system 600. In one example, the calibration input 160 receives calibration data from a computing device to calibrate the guide system 600. The calibration data can include the maximum distance, the minimum distance and the threshold distance. In one example, the calibration input 160 is a calibration button and the processor 130 is configured to set the minimum distance, the maximum distance or the threshold distance based on the distance measured by the sensor 110 when the calibration button is activated.

Figure 16:
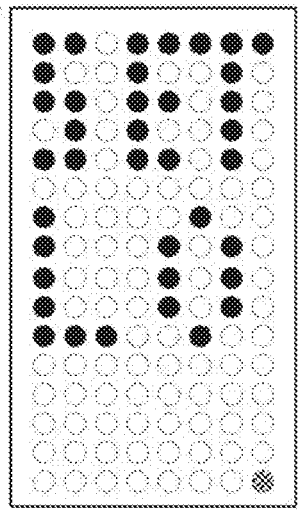
FIG. 16 illustrates the display prompting for a calibration value for the minimum distance in accordance with an embodiment of the disclosure.
Figure 17:
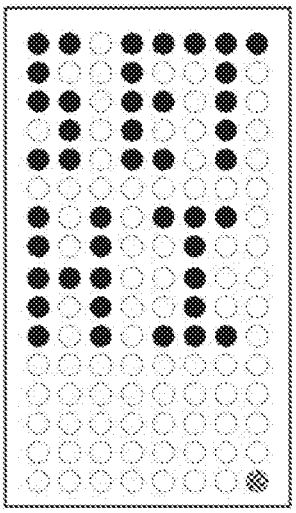
FIG. 17 illustrates the display prompting for a calibration value for the maximum distance in accordance with an embodiment of the disclosure.

In some embodiments, the calibration button is held to enable calibration and then receives an input of the maximum distance, a minimum distance or the threshold distance when the calibration button is pressed again. For example, when the calibration button is held at or near the minimum distance, the display 120 shows the text "SET LO" as shown in FIG. 16. The operator can then move the sensor 110 such that a desired minimum distance is measured and press the calibration button to set the minimum distance as the measured distance. The display 120 then shows the text "SET HI" as shown in FIG. 17. The operator can then move the sensor 110 such that a desired maximum distance is measured and press the calibration button to set the maximum distance as the measured distance. In some embodiments, the threshold distance is set in a similar manner to the minimum distance and the maximum distance. In some embodiments, multiple threshold distances can be set to define more than two distance intervals.

In some embodiments, the processor 130 is configured to receive the minimum distance and the maximum distance, and determine the threshold distance based on the minimum distance and the maximum distance. For example, the processor is configured to determine the threshold distance as being the minimum distance plus a percentage of the range between the minimum distance and the maximum distance. The percentage is typically less than 30% such that the scale used for the close distance indicator 330 is significantly finer than the scale used for the far distance indicator. In one example, the percentage is 10%.

Figure 18:
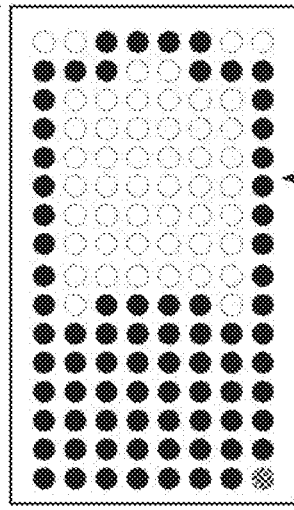
FIG. 18 illustrates the display showing a low battery alert in accordance with an embodiment of the disclosure.
Figure 19:
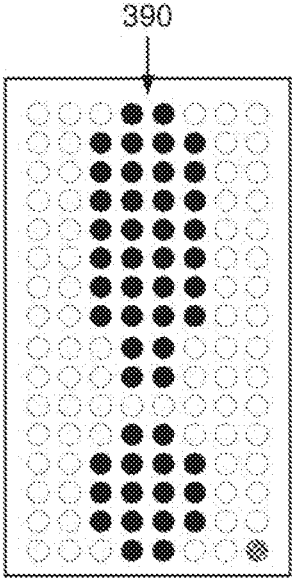
FIG. 19 illustrates the display showing a system alert in accordance with an embodiment of the disclosure.

In some embodiments, the processor displays alerts on the display 120 based on the status of the system 600. In one example, the processor 130 displays a battery critical alert 380 on the display 120 if the voltage of the battery drops below a threshold, as shown in FIG. 18. In one example, the processor 130 displays an alert symbol 390, as shown in FIG. 19, if the system 600 is not functioning correctly, such as if there is a problem with a sensor 110. In some embodiments, the processor 130 disables the system 600 if there is an alert. This can mitigate the risk that an operator collides the first object with the second object by being guided by incorrect sensor readings.

Figure 20:
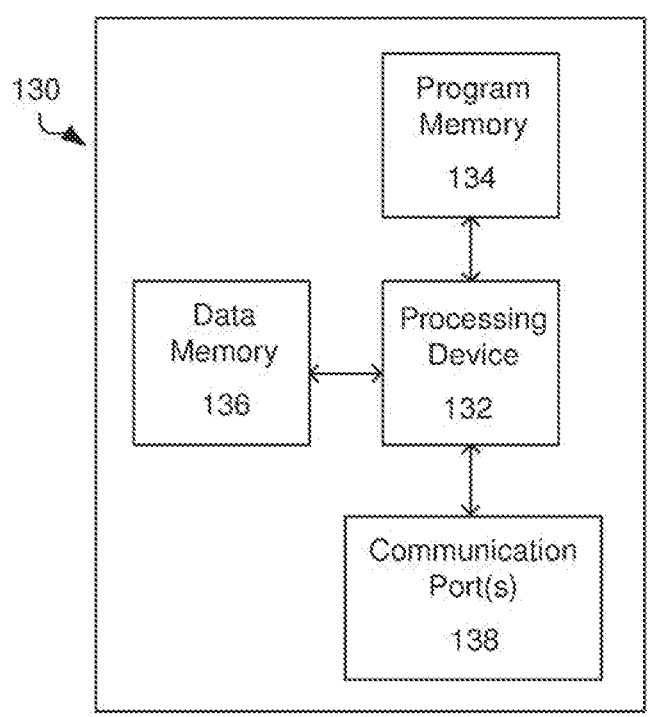
FIG. 20 illustrates the processor of FIG. 1 in more detail.

FIG. 20 illustrates a processor 130 in accordance with an embodiment of the disclosure. The processor 130 comprises a processing device 132 connected to a program memory 134, a data memory 136 and one or more communication ports 138. The program memory 134 can be a FLASH memory, EEPROM, or other non-transitory computer readable medium, such as a hard drive, a solid state disk or CD-ROM. An executable program stored on program memory 134 causes the processing device 132 to perform aspects of the disclosure. For example, the executable program stored on program memory 134 causes the processing device 132 to determine whether a distance measured by a sensor 110 connected to one of the communication ports 138 is within one of a plurality of distance intervals, and upon determining that the distance is within one of the plurality of distance intervals, display a distance indicator in a location on a display 120, that is connected to one of the communication ports 138, based on the distance according to a scale for the distance interval.

The processing device 132 may store the settings such as the display intervals in the program memory 134, for example, as a maximum distance value, a minimum distance value and one or more threshold distance values.

The processing device 132 may store the data from the sensor 110 and current settings of the display 120 in the data memory 136, such as on RAM or a processor register. The executable program stored on program memory 134 may also cause the processor 132 to determine the distance from one or more sensor measurements received via one or more of the communications ports 138.

In preferred embodiments, the processor 130 receives and processes measurements from the sensor 110 and updates the display 120 in real time. For example, this means that the processing device 132 interprets the measurement data or signal received from the sensor 110 and updates the display 120 based on the measurement data or signal every time a new distance measurement is received or every time the distance measurement changes by enough to cause a change in position of the distance indicator on the display 120.

In some embodiments, the sensor(s) 110, the processor 130 and the display(s) 120 are in close proximity and can be embodied in a contained system that can be mounted, for example, to one of the objects or a vehicle moving one of the objects. In one example, the display 120 is attached to a housing which houses the processor 130, and the sensor(s) 110 are connected to the housing by cables or mounted to the housing. This can allow the system to be easily transported and mounted for use.

Embodiments of the disclosure can assist in guiding an object as a distance between the object and another object reduces by providing a simple high precision distance indication using a low resolution display that uses a low amount of power and is visible in daylight.

Guide systems and methods described herein may assist with movement of a first object into close proximity with a second object while avoiding a collision or other contact between the objects. For example, the first object may be in close proximity with the second object when the first object is within a desired distance of the second object such as to allow a desired function or just touching the second object. Close proximity may be defined depending on the employed machinery. For example, gangways or stairs may have an extendible lip that can bridge a defined maximum distance. In this case, close proximity would be within that maximum distance. Close proximity may also be defined as the accuracy of the movement actuators. For example, it may not be possible to control an object using a joystick within less than 1 cm. Then, the distance of 1 cm would be close proximity. Close proximity may also describe the situation where the operator is not reasonable able to see the distance accurately anymore from a typical operating distance. The systems and methods disclosed may find particular application in circumstances in which the desired distance between the objects is small relative to the objects, for example, less than one tenth, one fiftieth or one hundredth of the largest linear dimension of the smaller of the two objects. Such applications may include, for example, the movement of aeroplane stairs into close proximity with an aeroplane so that the stairs can be used for their desired function, or the movement of a vehicle into close proximity with a building or other object to park the vehicle or deploy a delivery.

The term "processor" as used herein includes within its scope any device that processes data. For example, the processor 130 may include an integrated circuit, an application specific integrated circuit, a microcontroller, a microprocessor, a computer system or any similar device, or a combination thereof. The processor 130 may include programmable memory which includes instructions to execute aspects of the invention described herein and may be used to store calibration settings such as the maximum distance, the minimum distance and one or more threshold distances. In some embodiments, the processor is an ATmega328 microcontroller produced by Atmel.

The term "sensor" as used herein includes within its scope both analog sensors and digital sensors. For example, the processor 130 may receive data from the sensor 110 in as an analog signal representing the distance and process the analog signal to determine the distance, or the processor 130 may receive data from the sensor 110 as a digital data representing the distance and process the digital data to determine the distance, if necessary.

The term "dot matrix display" as used herein includes within its scope a dot matrix of lights, such as LEDs or mechanical indicators that can be switched on or off based on instructions or signals from the processor 130. The dots or pixels in the dot matrix can be of a single color or multiple colors, such as dot matrix displays using 3 color LEDs or "NeoPixel" dot matrix displays provided by Adafruit.

While embodiments have been illustrated with two distance intervals, some embodiments of the invention may have more than two distance intervals and these intervals may include the far distance interval 330 and the close distance interval 340.

While embodiments have been illustrated with the distance indicators as lines, the distance indicators may be another shape or design, such as a circle, an ellipse or a T-shape.

While embodiments have been illustrated with the distance between objects reducing over time, the disclosed methods and devices are equally applicable to objects moving away from each other resulting in increasing distance over time.

Figure 21:
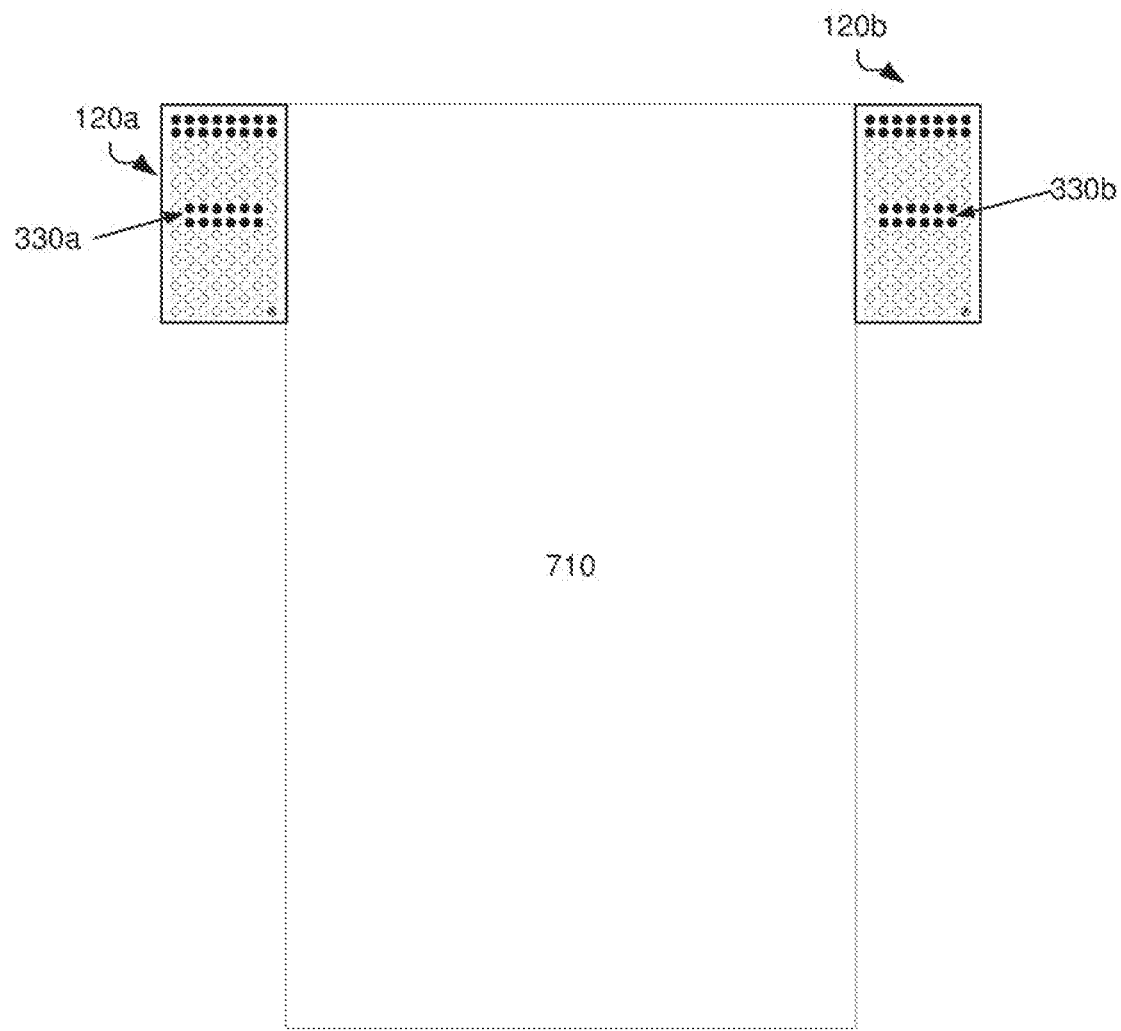
FIG. 21 illustrates a ramp with a display either side of the ramp to assist with aligning the ramp.

In one example, it is the aim of the operator to keep an object, such as a loading ramp, parallel to another object, such as an aeroplane. FIG. 21 illustrates a ramp with two displays 120a and 120b installed at either side of the ramp 710. Each display 120a and 120b is connected to respective processors (not shown) and distance sensors (not shown). The distance sensors can be located at either side of the ramp 710 with their associated display 120a or 120b. The operator can then observe the two displays 120a and 120b and steer the ramp such that the lines 330a and 330b on the two displays 120a and 120b are at an equal position within the display, that is, the two displays 120a and 120b are aligned. To achieve parallel movement, the operator may move one side that is indicated as being closer to the aeroplane away from the aeroplane to achieve alignment between the two displays 120a and 120b. If this alignment is performed while the display device uses the fine scale or the finest scale, the parallel movement can be extremely accurate.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A guide system comprising:
   a sensor configured to measure a distance between a first object and a second object;
   a display including a display area; and
   a processor communicatively coupled to the sensor and the display, the processor being configured to:
   responsive to determining that the distance is within a predefined far distance interval;
   designate a dimension of the display area to represent the far distance interval; and
   display a far distance indicator in the display area at a first location along the dimension that is based on the distance according to a coarse scale; and
   responsive to determining that the distance is within a predefined close distance interval;
   designate the dimension of the display area to represent the close distance interval; and
   display a close distance indicator in the display area at a second location along the dimension that is based on the distance according to a fine scale.

2. The guide system of claim 1, wherein the far distance interval is defined between a threshold distance and a maximum distance.

3. The guide system of claim 2, wherein the coarse scale defines locations along the display area such that one end of the display area corresponds to the maximum distance and the other end of the display area corresponds to the threshold distance.

4. The guide system of claim 2, wherein the close distance interval is defined between a minimum distance and the threshold distance.

5. The guide system of claim 4, wherein the fine scale defines locations along the display area such that one end of the display area corresponds to the threshold distance and the other end of the display area corresponds to the minimum distance.

6. The guide system of claim 4, wherein the processor is further configured to:
receive one or more of the minimum distance, the maximum distance, and the threshold distance.

7. The guide system of claim 6, wherein the processor is further configured to:
determine the threshold distance based on the minimum distance and the maximum distance.

8. The guide system of claim 7, wherein the threshold distance is determined as the minimum distance plus a percentage of a range between the minimum distance and the maximum distance.

9. The guide system of claim 4, further comprising:
a calibration input,
wherein the processor is further configured to:
measure the distance responsive to the calibration input; and
set one or more of the minimum distance, the maximum distance, and the threshold distance based on the measured distance.

10. The guide system of claim 1, wherein the processor is further configured to:
display the far distance indicator in a first color; and
display the close distance indicator in a second color that is distinct from the first color.

11. The guide system of claim 1, wherein the processor is further configured to:
display one or both of the far distance indicator and the close distance indicator as representing the first object; and
display a second indicator in the display area to represent the second object.

12. The guide system of claim 11, wherein the one or both of the far distance indicator and the close distance indicator and the second indicator are displayed as parallel lines.

13. The guide system of claim 11, wherein the processor is further configured to locate the far distance indicator relative to the second indicator on the display based on the distance measured by the sensor and the coarse scale.

14. The guide system of claim 11, wherein the processor is further configured to:
locate the close distance indicator relative to the second indicator in the display area based on the distance measured by the sensor relative to the fine scale.

15. The guide system of claim 1, wherein the processor is further configured to:
display the close distance indicator across a greater number of pixels than the far distance indicator.

16. The guide system of claim 1, wherein the processor is further configured to:
responsive to determining that the distance is within a predefined further distance interval:
display a further distance indicator on the display at a third location that is based on the distance according to a further scale.

17. The guide system of claim 1, wherein the display has less than 1000 pixels.

18. The guide system of claim 1, wherein the display has a pixel density of less than 50000 pixels per square meter.

19. The guide system of claim 1, wherein the display is a dot matrix display.

20. The guide system of claim 19, wherein the dot matrix display is a multicolor light emitting diode (LED) matrix.

21. The guide system of claim 19, wherein the dot matrix display has a rated luminance of greater than 1000 $cd/m^2$.

22. The guide system of claim 1, wherein the display is mounted on one of:
the first object;
the second object;
a vehicle moving one of the first object and the second object.

23. The guide system of claim 1, further comprising:
a photovoltaic power supply connected to the processor, the sensor, and the display.

24. The guide system of claim 1, wherein the far distance indicator and the close distance indicator are each displayed as lines.

25. A method for indicating a distance between a first object and a second object, the method comprising:
measuring the distance using a sensor;
determining whether the distance is within one of a predefined far distance interval and a predefined close distance interval; and performing one of:
responsive to determining that the distance is within the far distance interval;
designating a dimension of a display area of a display to represent the far distance interval; and
displaying a far distance indicator in the display area at a first location along the dimension that is based on the distance according to a coarse scale; and
responsive to determining that the distance is within the close distance interval;
designating the dimension of the display area to represent the close distance interval; and
displaying a close distance indicator in the display area at a second location along the dimension that is based on the distance according to a fine scale.

26. A method for visually representing a distance between two objects, the method comprising:
displaying, based on the distance, a distance indicator at a first location within a first distance interval represented between a first end and a second end of a display area of a display;
as the two objects move closer to each other, moving the distance indicator away from the first end of the display area and toward the second end of the display area; and
when the two objects are closer to each other than a distance threshold, displaying the distance indicator at a second location within a second distance interval represented between the first end and the second end of the display area, wherein the second distance interval is smaller than the first distance interval.

27. A guide system comprising:
sensors oriented in distinct directions to measure respective distances in the respective directions between a first object and a second object;
a respective display associated with each sensor of the sensors; and
a processor communicatively coupled to the sensors and the respective displays, the processor being configured to, for each sensor of the sensors:

responsive to determining that the respective distance is within a predefined far distance interval:
  designate a respective dimension of a display area of the respective display to represent the far distance interval; and
  display a far distance indicator in the display area at a first location along the respective dimension that is based on the distance according to a coarse scale; and responsive to determining that the respective distance is within a predefined close distance interval:
  designate the respective dimension of the display area of the respective display to represent the close distance interval; and
  display a close distance indicator in the display area at a second location along the respective dimension that is based on the distance according to a fine scale.

28. The guide system of claim 27, wherein each display is oriented based on the orientation of the respective sensor.

* * * * *

UNITED STATES PATENT AND TRADEMARK OFFICE
CERTIFICATE OF CORRECTION

PATENT NO. : 10,685,548 B2
APPLICATION NO. : 16/319737
DATED : June 16, 2020
INVENTOR(S) : David Haddon et al.

Page 1 of 1

It is certified that error appears in the above-identified patent and that said Letters Patent is hereby corrected as shown below:

In the Claims

In Column 14, Line 50, in Claim 1, delete "interval;" and insert -- interval: --, therefor.

In Column 14, Line 57, in Claim 1, delete "interval;" and insert -- interval: --, therefor.

In Column 16, Line 31, in Claim 25, delete "interval;" and insert -- interval: --, therefor.

In Column 16, Line 38, in Claim 25, delete "interval;" and insert -- interval: --, therefor.

Signed and Sealed this
Fourth Day of August, 2020

Andrei Iancu
*Director of the United States Patent and Trademark Office*